United States Patent [19]
Lombard

[11] Patent Number: 5,871,220
[45] Date of Patent: Feb. 16, 1999

[54] SPINE BOARD DOLLY APPARATUS

[76] Inventor: Emile Lombard, 145 Sun Valley Dr., Slidell, La. 70458

[21] Appl. No.: 726,981

[22] Filed: Oct. 7, 1996

[51] Int. Cl.$^6$ ........................................................ B62B 1/00
[52] U.S. Cl. ..................................... 280/79.7; 280/47.131; 5/625; 128/870
[58] Field of Search ................................ 280/63, 47.131, 280/47.17, 47.18, 47.25, 47.34, 79.11, 79.2, 79.7; 5/621, 624, 625, 626, 627, 628, 629; 128/870, 876

[56] References Cited

U.S. PATENT DOCUMENTS

| | | | |
|---|---|---|---|
| 2,607,050 | 8/1952 | Binschoff | 5/81 |
| 2,919,138 | 12/1959 | Brower et al. | 280/35 |
| 3,462,186 | 8/1969 | Kessling | 296/20 |
| 3,865,392 | 2/1975 | Hartway | 280/47.131 X |
| 4,166,638 | 9/1979 | De Prado | 280/638 |
| 4,369,982 | 1/1983 | Hein et al. | 280/47.13 |
| 4,655,206 | 4/1987 | Moody | 128/134 |
| 5,121,514 | 6/1992 | Rosane | 5/628 |
| 5,179,746 | 1/1993 | Rogers | 5/625 |
| 5,201,089 | 4/1993 | Ferreira | 5/627 |
| 5,342,290 | 8/1994 | Schuellein | 128/870 X |

*Primary Examiner*—Peter M. Poon
*Assistant Examiner*—Pamela J. Lipka
*Attorney, Agent, or Firm*—Garvey, Smith, Nehrbass & Doody LLC

[57] ABSTRACT

A dolly type apparatus, which would include a body portion having four wall portions, and defining a substantially rectangular opening therein, into which a typical spine board may be slid into the opening. The body portion further includes a pair of wheels, for allowing the body portion to be rolled onto a surface; there is further included a shelf member extending substantially out of the lower end of the body portion, onto which a patient placed on the spine board may rest his or her feet during transport; there is further provided strap members which extend from a first forward wall of the body portion through a pair of openings in the spine board and would reattach on the rear wall of the body portion for maintaining the spine board held in place in the opening in the body portion, so that a patient who is strapped to the spine board and whose feet are resting on the shelf member, may be raised substantially to the vertical position and the spine board may be rolled through tight passageways, during transport without affecting the stability or movement of the patient being transported.

9 Claims, 2 Drawing Sheets

SPINE BOARD DOLLY APPARATUS

BACKGROUND OF THE INVENTION

1. Field of the Invention

The apparatus of the present invention relates to a spine board dolly. More particularly, the present invention relates to an apparatus whereby a spine board with a patient strapped thereupon may be secured to the apparatus so the spine board may be rolled along a surface rather than carried due to spacial requirements.

2. General Background

In the field of medical services, one such service requires that individuals who are injured at their home or the like, are often attended to by medical personnel in an ambulance setting, such as a service provided under 911. In such a case, due to the spacial requirements of an ambulance, the ambulance attendants utilize a patient carrier, which is commonly referred to as a spine board, which is a flat board constructed of a strong, solid material, which may be light weight, yet be of sufficient width and length in order to accommodate an average sized individual who has been injured or is in medical need, thereupon. In normal circumstances, the injured person is strapped to the spine board, and the spine board includes a series of openings along its length so that the attendants may grasp the spine board through the openings and carry the individual from the place of injury to the vehicle for transport to the hospital or other area.

It is most desirable, that in transport of a patient with a spine board, that the spine board be maintained in a horizontal position, so that the patient is cared for properly, and is as comfortable as possible during transport by the medical attendants. It is quite often a problem, when an individual is injured in either a plant setting or an office setting, where following the individual being strapped to the spine board, because of confining passageways such as a hallway or the like, it is quite difficult to move the individual through a doorway into a narrow hallway. Therefore, when the spine board has to be moved, for example, through a doorway into a narrow hallway, because of the spacial problems, the spine board must be tilted from the horizontal to a substantial vertical position so that it may be maneuvered around a tight corner. Of course, this is undesirable since when it is lifted in such a fashion, unless the patient is grasped very tightly, the patient will simply slide off of the board, although strapped in place. This, of course, may have a result which is totally undesirable, and could result in additional trauma to the patient and even liability to the company who is transporting the injured individual.

Therefore, there is a need in the art for allowing the spine board to be adapted to an apparatus which would allow movement of the spine board from the substantially horizontal position to a substantially vertical position, yet maintaining the patient strapped onto the spine board, without any movement of the patient off of the board.

Applicant is submitting a prior art statement which makes reference to patents found in the art which may be pertinent to the present invention.

SUMMARY OF THE PRESENT INVENTION

The apparatus of the present invention solves the shortcomings in the art in a simple and straight forward manner. What is provided is a dolly type apparatus, which would include a body portion having four wall portions, and defining a substantially rectangular opening therein, into which a typical spine board may be slid into the opening. The body portion further includes a pair of wheels, for allowing the body portion to be rolled onto a surface. There is further included a shelf member extending substantially out of the lower end of the body portion, onto which a patient placed on the spine board may rest his or her feet during transport. There is further provided strap members which extend from a first forward wall of the body portion through a pair of openings in the spine board and would reattach on the rear wall of the body portion for maintaining the spine board held in place in the opening in the body portion, so that a patient who is strapped to the spine board and whose feet are resting on the shelf member, may be raised substantially to the vertical position and the spine board may be rolled through tight passageways, during transport without affecting the stability or movement of the patient being transported.

Therefore, it is a principal object of the present invention to provide a spine board dolly apparatus which allows a spine board to be secured onto the apparatus so that the spine board, while carrying a patient, may be moved from a substantially horizontal position to a substantially vertical position without the patient encountering movement or further trauma;

It is a further object of the present invention to provide a spine board dolly apparatus which allows a spine board to be secured therethrough so the spine board may be rolled during transport and may be moved substantially vertically so as to allow the spine board to be moved within confined areas;

It is a further object of the present invention to provide a spine board dolly apparatus which is compact in its construction, for allowing the apparatus to be easily stored onto an emergency vehicle, and occupy very little space on the vehicle during storage;

It is a further object of the present invention to provide a spine board dolly apparatus which when secured to a spine board allows a patient to be strapped onto the board and if necessary, the spine board may be rolled and moved from a horizontal to a vertical position for maneuvering around corners or through narrow hallways, without any movement of the patient on the board or off of the board as the patient is tilted to the vertical position;

It is a further object of the present invention to provide a spine board dolly apparatus which can be secured to a spine board through openings which are currently provided in spine boards, so as to secure the spine board onto the apparatus while being used;

It is a further object of the present invention to provide a spine board dolly apparatus which would enable a spine board upon which a patient is placed to be rolled between destinations, rather than carried, which would reduce potential back injury to the medical attendants.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
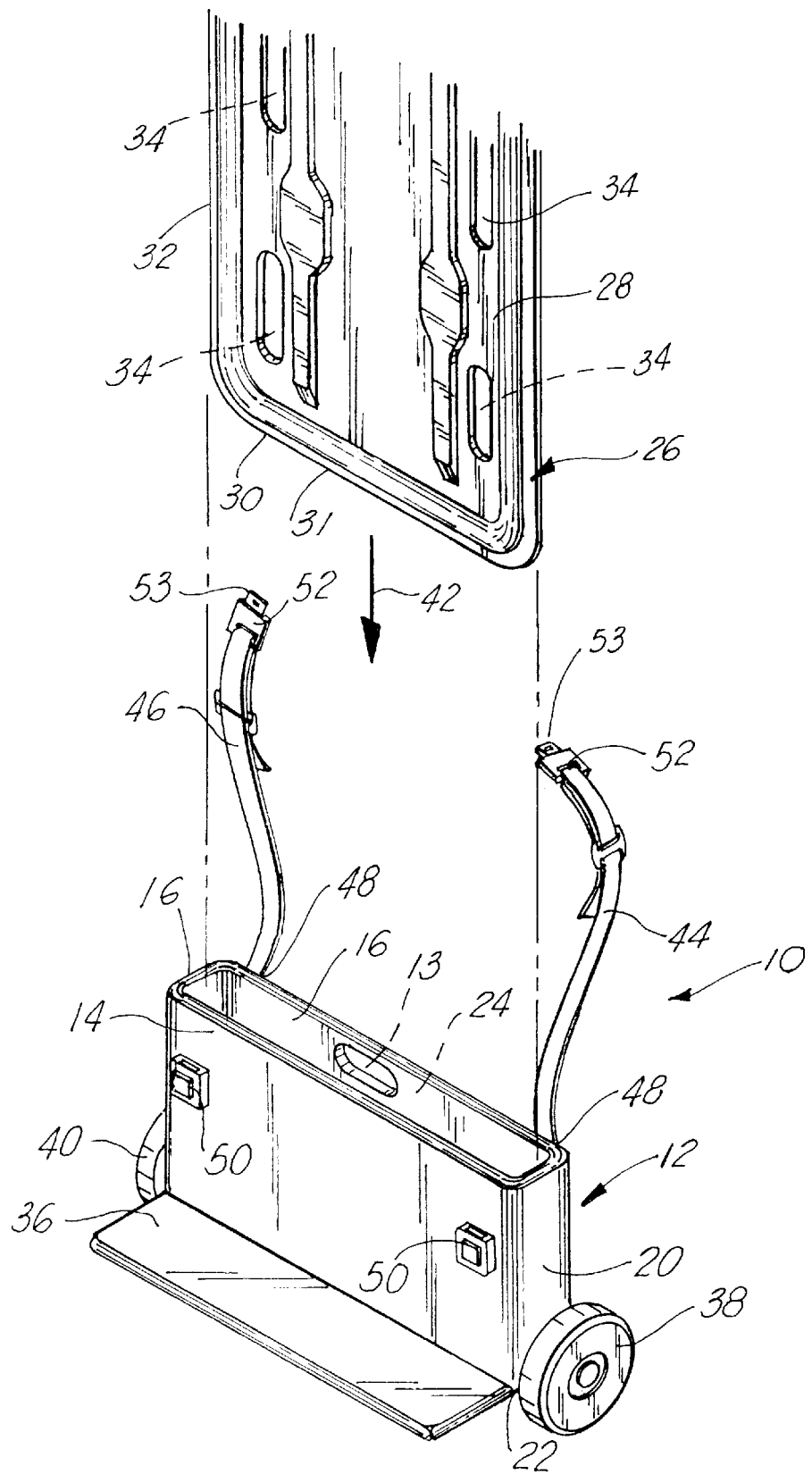
FIG. 1 illustrates an overall view of the preferred embodiment of the apparatus in position to accommodate a spine board thereunto.
Figure 2:
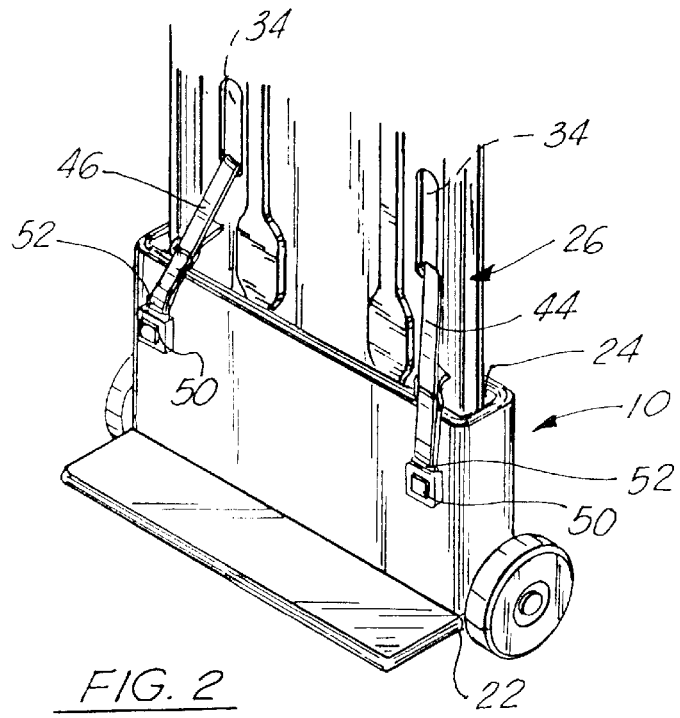
FIG. 2 illustrates an overall view of the preferred embodiment of the apparatus of the present invention accommodating a spine board strapped therein.
Figure 3:
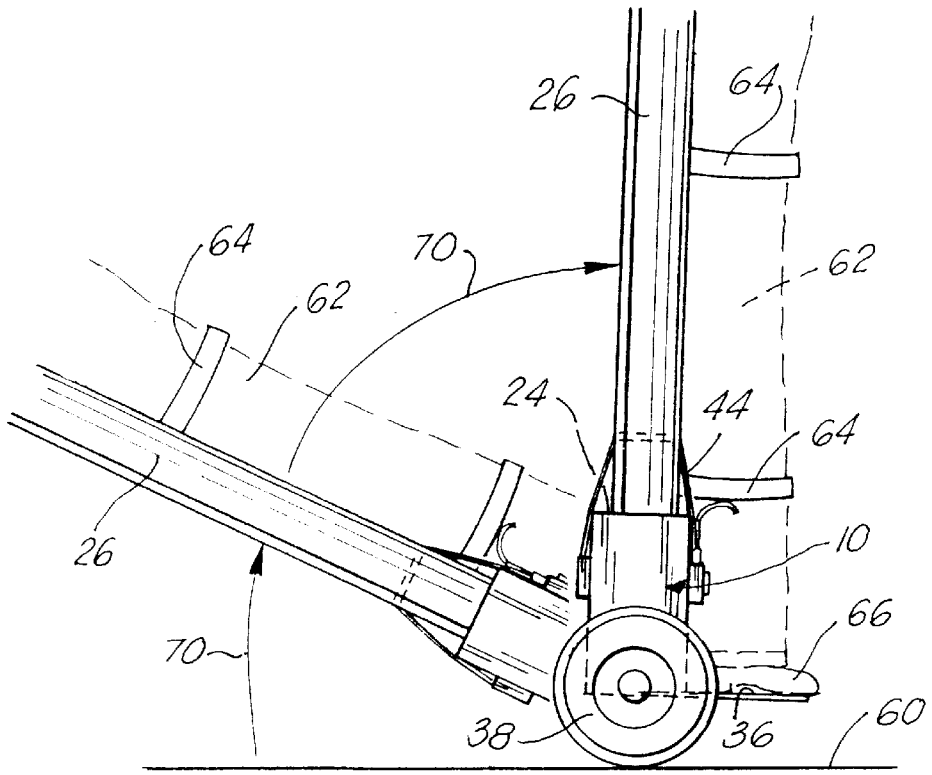
FIG. 3 illustrates a side view of the apparatus of the present invention accommodating a spine board with a patient strapped onto the board as the board is moved from the substantially horizontal to the substantially vertical position during transport.

FIGS. 1–3 illustrate the preferred embodiment of the apparatus of the present invention by the numeral 10. The apparatus would be of sufficient dimensions for operating in combination with a typical spine board 26 which is illustrated in FIG. 1, which is of the type to be utilized in a medical vehicle for transport of patients from a site of trauma to a medical facility. Such spine boards are well known in the art, and would in general be substantially five to six feet in length, and as illustrated in FIG. 1 in partial view, would be constructed in a unitary body 28 constructed of a solid, strong yet light weight material, with the body 28 having a width 30 which would substantially conform to the width of an average adult, and a length 32 which likewise would conform to the average height of an adult. The board would normally include a plurality of openings 34 along its length so as to allow the attendants of the medical vehicle to grasp the spine board at various points along its length in order to carry the patient. Under normal conditions, the spine board would be utilized transporting a patient in the substantially horizontal position with the patient strapped on the board in the event that the board was inadvertently dropped or the board had to be rotated slightly during the movement of the patient.

Spine board dolly apparatus 10 would comprise generally a body portion 12 which would include a forward wall 14, a rear wall 16, side walls 18, 20, a floor portion 22 (not illustrated), with the forward and rear wall and side walls defining a substantially rectangular opening 24 there within. As seen in FIG. 1, the dolly apparatus 10 would also include a foot member 36 extending out from the floor 22 of dolly apparatus 10, the foot member which would be utilized to place a patient's feet thereupon as will be discussed further. Further, the apparatus would include a pair of wheel members 38, 40, along each end wall 18, 20, with the wheel members secured at the ends of an axle or the like, or secured individually to body 12, for allowing free rotation of the wheels as is typically found in a normal dolly. Further, as illustrated in FIG. 1, the spine board 26 is seen being moved downward in the direct of arrow 42, so that the board 26 would be slidably engaged within opening number 24 of dolly 10. There is further included on dolly 10, a pair of strap members 44, 46, each of the strap members would extend from a first mounting end 48 along the rear wall 16 of the apparatus and when locked in place would be locked onto the lock members 50 secured on the forward wall 14 of the apparatus. Although in FIG. 1 the lock members 50 are illustrated as being secured to forward wall 14, it is foreseen that the lock members 50 may be positioned at one end of a short strap, the second end which would be secured to the forward wall of the dolly apparatus 10. In the preferred embodiment, the types of locks which may be utilized are the types which may be found on an automobile car seat or an airline seat, which would be easily engaged and disengaged as need be. Further, each end of the strap members 44, 46 would include the lock mechanism 52 to be secured to lock member 50. It is important to note that the lock mechanism 52 must be of a sufficient size so that it may slide through each of the openings 34 at it moves to be locked in place as will be discussed further.

Turning now to FIG. 2, apparatus 10 is illustrated with the spine board 26 having been placed within opening 24 within apparatus 10. The spine board will have been lowered and its lower end 31 would make contact and resting on the floor 22 of apparatus 10. At that point, each of the strap members 44, 46 would be threaded through each of the openings 34 in the spine board and the end portion 53 of each of the straps would be lockingly engaged into each of the lock members 50 on the apparatus as illustrated in FIG. 2. Of course, it is foreseen that once the locks are engaged, then the end of the straps 44, 46 may be pulled tight so that the straps are maintained in a very tight position through each of the openings 34 so that there is no movement between the spine board 26 and the apparatus 10 for use. It should further be noted that although the straps 44, 46 are being shown threaded through the second set of openings 34 within spine board 26, since spine board 26 has a plurality of openings throughout its length, depending on the length of the straps, the straps may be secured through any of those openings if the length of the straps would allow it to be secured so.

Following the securing of the spine board 26 onto apparatus 10, reference is made to FIG. 3 where there is illustrated in side view the spine board apparatus 10 accommodating the spine board 26 within the opening 24 with the straps 44, 46 engaged and locked in place as illustrated. As seen in FIG. 3, the wheels 38, 40 are in contact with a surface 60 such as the floor or the like, and in the first view, there is illustrated a patient 62 secured onto the spine board 26 held in place by straps 64 which are the standard straps which are utilized on a spine board in order to hold the patient as was discussed earlier. As seen clearly in FIG. 3, the feet 66 of the patient 62 are seen making or placed onto the upper surface of shelf 36 so that when the spine board is moved to the vertical position as seen in FIG. 3, the patient cannot move downward due to the pull of gravity since the patient's feet 66 are resting on the shelf 36. As further illustrated in FIG. 3, the patient 62 after having been strapped onto the board via strap 64 has been raised in the direction of arrow 70 from the substantially horizontal position along surface 60 to the substantial vertical position as also seen in the FIGURE. It is in this position when the patient is vertical that the spine board may be maneuvered through doorways and around corners of narrow hallways in order to move the patient safely from the point of trauma into the medical vehicle. Of course, because of wheels 38, instead of having to carry the patient through these tight corners in the vertical position, the spine board may simply be rolled through the passageways easily. And, of course, after making its way to the medical vehicle, the dolly apparatus is simply disengaged from the spine board 26 by disengaging the lock members 50 from straps 44, 46 and allowing the spine board to be removed from the apparatus and the patient safely placed within the medical vehicle.

Because of the size of the apparatus, as illustrated, the apparatus can easily be stored within the confined spaces of a medical vehicle without occupying that much room, yet when needed, can be easily carried via the opening 13 in the body of the apparatus, by the medical personnel. The dolly apparatus may be modified in its construction so that the opening 24 within the apparatus may be of various dimensions so as to accommodate various sizes of spine boards 26. Additionally, because the dolly apparatus is secured to the very end portion 30 of spine board 26, the apparatus is very non-intrusive in regard to the placement of the patient on the spine board, but for the two straps that can carefully be threaded through the openings 34 within the spine board so that the patient may rest easily on the spine board only with making very little contact with the apparatus of the present invention.

The following table lists the part numbers and part descriptions as used herein and in the drawings attached hereto.

PARTS LIST

| Description | Part No. |
|---|---|
| spine board dolly apparatus | 10 |
| body portion | 12 |
| forward wall | 14 |
| rear wall | 16 |
| side walls | 18, 20 |
| floor portion | 22 |
| rectangular opening | 24 |
| spine board | 26 |
| unitary body | 28 |
| width | 30 |
| lower end | 31 |
| length | 32 |
| plurality of openings | 34 |
| shelf or foot member | 36 |
| wheel members | 38, 40 |
| arrow | 42 |
| strap member | 44, 46 |
| first mounting end | 48 |
| lock members | 50 |
| lock mechanism | 52 |
| end portion | 53 |
| surface | 60 |
| patient | 62 |
| straps | 64 |
| feet | 66 |
| arrow | 70 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A dolly apparatus in combination with a spine board, comprising:
   a. a body portion having sidewalls and defining an opening there within for receiving an end of the spine board;
   b. a pair of wheels freely secured to the body portion;
   c. strap members having a first end secured to the body portion;
   d. the end of the spine board insertable into the opening in the body portion, and secured thereto with said strap members, so that the spine board engaged to the body portion may be rolled along a surface, rather than carried; and
   e. locking members on a second end of the strap members for engaging to the body portion after the strap members have been threaded through openings in the spine board.

2. The apparatus in claim 1, further comprising a foot member extending outward from the body portion so that a patient's feet may rest on the foot member during transport.

3. The apparatus in claim 1, wherein the apparatus further comprises an opening in one sidewall for manually carrying the apparatus.

4. A dolly apparatus, in combination with a spine board, of the type having a flat surface upon which a patient may be secured, the apparatus comprising:
   a. a body portion having sidewalls and defining an opening there within for receiving an end of the spine board thereunto;
   b. a pair of wheels secured to the body portion for free rotation;
   c. strap members having a first end secured to the body portion and a second end having lock engaging members;
   d. lock members on a wall of the body portion for receiving the lock engagement members of the strap members:
   e. a foot member extending outward from the body portion;
   f. the first end of the spine board insertable into the opening in the body portion, and secured thereto with said strap members when said strap members are secured to said lock members, so that when a patient is secured to the spine board, the board may be rolled along a surface in substantially a vertical plane with the patient supported by the foot member.

5. The apparatus in claim 4, wherein the lock engaging members are threaded through openings in the spine board to maintain the board secured within the opening in the body portion, when the lock engaging members are secured to the lock members.

6. An apparatus for allowing a patient to be moved along a surface in substantially vertical orientation, comprising:
   a. a spine board portion, of the type having a flat surface upon which the patient is secured through straps;
   b. a dolly portion, further comprising:
      i. a body portion having sidewalls and defining an opening there within for receiving an end of the spine board;
      ii. a pair of wheels secured to the body portion for free rotation;
      iii. at least one strap member having a first end secured to the body portion and a second end having lock engaging members threadable through an opening in the spine board and engaged to lock members on the body portion; and
      iv. a foot member extending outward from the body portion on which the patient's feet make contact when the end of the spine board is engaged within the opening in the body portion and the spine board is moved to substantially the vertical position to be rolled along the floor.

7. The apparatus in claim 6, wherein there may be included a second strap member for securing the spine board portion to the dolly portion.

8. The apparatus in claim 6, wherein the dolly portion further comprises an opening in one of the sidewalls for manually carrying the apparatus when not engaged to the spine board portion.

9. The apparatus in claim 6, wherein the dolly portion of the apparatus is dimensionally compact to occupy minimal space within an ambulance during transport.

\* \* \* \* \*